United States Patent [19]

Williams

[11] Patent Number: 4,577,734
[45] Date of Patent: Mar. 25, 1986

[54] BRAKE DRUM

[75] Inventor: Richard J. Williams, Kenton, Ohio

[73] Assignee: Rockwell International Corporation, Pittsburgh, Pa.

[21] Appl. No.: 572,274

[22] Filed: Jan. 20, 1984

[51] Int. Cl.[4] .............................................. F16D 65/10
[52] U.S. Cl. ...................... 188/218 R; 188/264 R; 192/113 A; 301/6 CS
[58] Field of Search ..... 188/218 R, 218 XL, 264 AA, 188/264 A, 18 R, 71.6, 17, 264 R; 301/6 W, 6 CS, 65; 192/70.12, 107 T, 113 A

[56] References Cited

U.S. PATENT DOCUMENTS

| | | | |
|---|---|---|---|
| 1,137,939 | 4/1915 | Wern | 192/113 A |
| 1,814,575 | 7/1931 | Tatter | 188/218 R |
| 2,563,769 | 7/1951 | Wyant | 188/264 AA |
| 2,708,011 | 5/1955 | Ronning | 188/264 R |
| 2,748,903 | 6/1956 | Foster | 188/264 R |
| 2,761,530 | 9/1956 | Dawley | 188/264 R |
| 2,844,229 | 7/1958 | Whitfield | 188/264 R |
| 2,858,913 | 11/1958 | Afanador | 188/218 R |
| 2,896,749 | 7/1958 | Gaylord | 188/264 R |
| 2,910,148 | 10/1959 | Ferrell et al. | 188/218 R |
| 2,927,822 | 3/1960 | Rabe | 301/6 CS |
| 2,998,870 | 9/1961 | Herman et al. | 188/264 R |
| 3,035,667 | 5/1962 | Malthaner | 188/218 R |
| 3,043,630 | 7/1962 | Heitzman | 188/264 R |
| 3,057,442 | 10/1962 | McCann et al. | 188/264 R |
| 3,103,994 | 9/1963 | Kelly | 188/264 R |
| 3,118,521 | 1/1964 | Robinette et al. | 188/264 R |
| 3,140,760 | 7/1964 | Rasmussen | 188/78 |
| 3,151,710 | 10/1964 | Troy | 192/107 T X |
| 3,171,527 | 3/1965 | Ott | 188/264 A X |
| 3,583,533 | 8/1971 | Jones et al. | 188/218 R |
| 3,743,063 | 7/1973 | Heydenreich et al. | 188/218 R |
| 3,993,172 | 11/1976 | Schmitz | 188/18 R |

FOREIGN PATENT DOCUMENTS

| | | | |
|---|---|---|---|
| 1038593 | 9/1958 | Fed. Rep. of Germany | 188/218 XL |
| 1042984 | 11/1958 | Fed. Rep. of Germany | 188/218 R |
| 0134263 | 10/1979 | Japan | 188/264 A |

*Primary Examiner*—Bruce H. Stoner, Jr.
*Assistant Examiner*—Robert J. Oberleitner

[57] ABSTRACT

A brake drum includes a cylindrical braking drum having a flange end and an opened end and including a plurality of generally axially extending fins around an exterior surface thereof. Each of the fins has radially extending side walls which diverge along the length thereof from the opened end to a widest distance therebetween at a predetermined location from the opened end and converged along the length thereof from the predetermined location to the flange end. Accordingly, adjacent side walls of adjacent fins define a space therebetween which has its narrowest portion at the predetermined location. A steel band is secured to and encircles the braking drum at the predetermined location. The steel band cooperates with the adjacent side walls and the exterior surface of the braking drum to define a cooling air channel at the narrowest portion of each of the spaces.

3 Claims, 4 Drawing Figures

BRAKE DRUM

BACKGROUND OF THE INVENTION

1. Field of the Invention

This invention relates to a brake drum and, more specifically, to such a drum which includes a cylindrical braking drum having a plurality of generally axially extending fins and includes a band encircling the braking drum to define air cooling channels between the fins and to add overall strength to the braking drum.

2. Description of the Prior Art

Although drum brakes and the brake drums therefore are well known in the prior art, there remains a problem with dissipation of heat to ensure that there is effective braking during extensive use. Accordingly, many brake drums have heretofore employed fins or other cooling surfaces about the exterior surface thereof as a means for directing air along the exterior surface to remove the heat generated in the brake drum. However, many brake drums of this type include fins which are oriented helically or at an angle to provide an easy path for the cooling air therebetween. On the other hand, providing fins of this type has significantly complicated manufacture since most such brake drums are cast and casting in this manner normally requires some type of core unless the manufacture includes some means for otherwise cutting or forming grooves or fins.

Additionally, in any such brake drum, there remains a concern for its overall strength. Accordingly, it would be advantageous to incorporate any means which would improve the overall strength of the brake drum without unduly adding to its weight.

SUMMARY OF THE INVENTION

It is therefor an object of the invention to provide a braking drum having a plurality of generally axially extending fins around an exterior surface thereof and including a steel band to define cooling air channels and add strength to the drum.

These and other objects of the invention are provided in a preferred embodiment thereof including a brake drum having a cylindrical braking drum having a flange end and an opened end. The cylindrical braking drum has a plurality of generally axially extending fins around an exterior surface thereof. Each of the fins has radially extending side walls which diverge along the length thereof from the opened end to have a widest distance therebetween at a predetermined location from the opened end and converge along the length thereof from the predetermined location to the flange end. Accordingly, the adjacent side walls of adjacent fins define a space therebetween which has its narrowest portion at the predetermined location. A steel band is secured to and encircles the braking drum at the predetermined locations. The steel band cooperates with the adjacent side walls and the exterior surface of the braking drum to define a cooling air channel at the narrowest portion of each of the spaces.

DETAILED DESCRIPTION OF THE PREFERRED EMBODIMENT

Figure 1:
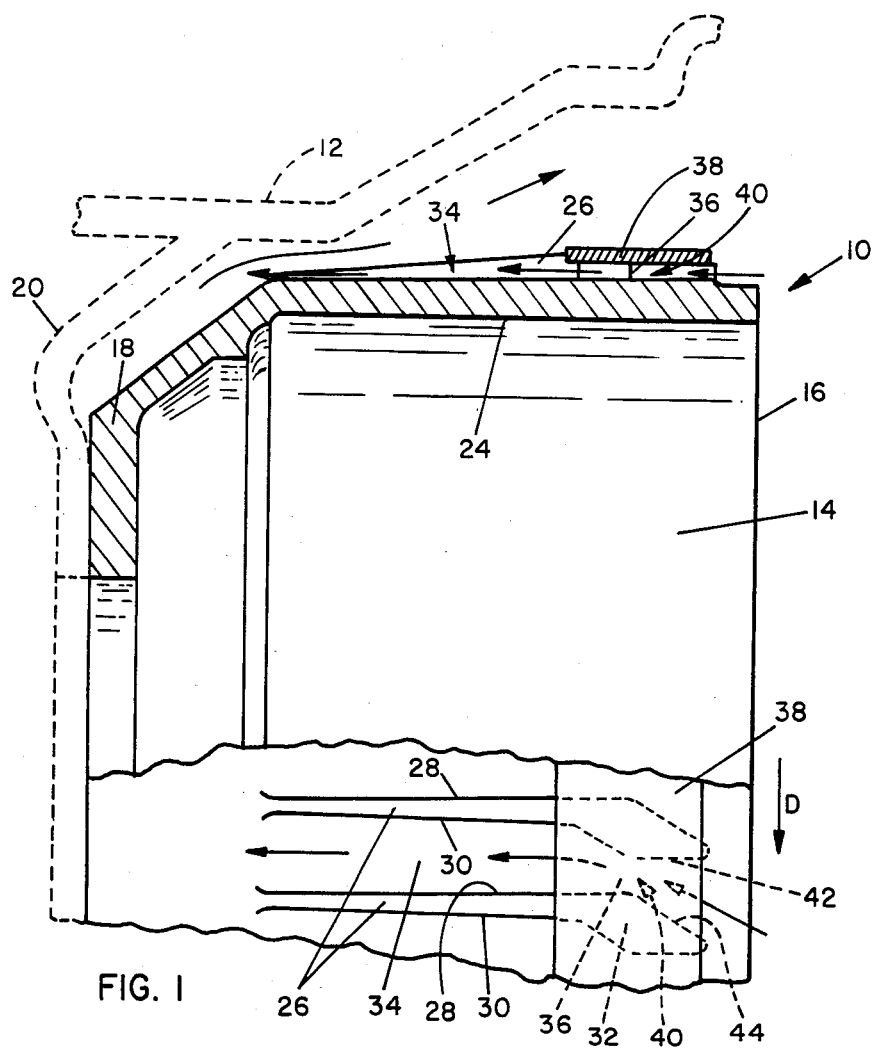
FIG. 1 is a fragmentary view, partially in section of the preferred drum brake including various features of the invention.

As seen in FIG. 1, the perferred brake drum 10 is mounted for rotation with a hub (not shown) supporting a wheel 12 of a heavy duty truck or trailer. The brake drum 10 includes the cylindrical braking drum 14 having an opened end 16 and a flange end 18 by which the brake drum 10 is secured to the hub. As shown in FIG. 1, the wheel 12 with which the preferred brake drum 10 is associated is only slightly larger than the brake drum 10 and is of such a design which includes no significant openings or holes through the radial wall 20 thereof. In other words, where the rim portion of the wheel 12 is to be significantly larger than the brake drum 10 or to include a plurality of openings in the radial wall 20, such as is found in spoked wheels, then the movement of cooling air about the brake drum 10 would not be considered as significant. However, with such a configuration in which the flow of air is restricted, it is desirable to include an efficient, reliable means for cooling the exterior surface 22 of the brake drum 10. Obviously, cooling the brake drum surface 22 will allow heat to also be dissipated from the braking surface 24 of the brake drum 10.

To facilitate the air cooling, the preferred brake drum 10 is provided with a plurality of generally axially extending fins 26 around the exterior surface 22. However, the preferred fins 26 are not designed to extend helically about the exterior surface 22 but are instead provided a contour which will be seen to produce the desired flow of air therebetween. Specifically, each of the fins 26 has radially extending side walls 28, 30 which diverge along a length thereof from the opened end 16 to have a widest distance therebetween at a predetermined location 32 from the opened end 16. The side walls 28, 30 converge along the length thereof from the predetermined location 32 to their terminal end at the flanged end 18 of the braking drum 14. Accordingly, adjacent side walls 30, 28 of adjacent fins 26 define a space 34 therebetween having its narrowest portion 36 at the predetermined location 32.

However, providing a contour such as described would not ensure the desired air flow as indicated by the plurality of arrows shown in FIG. 1. Accordingly, to produce a venturi effect at the narrowest portion 36 of the space 34, a steel band 38 is secured to and encircles the braking drum 14 at the predetermined location 32. The steel band cooperates with the adjacent side walls 30, 28 and the exterior surface 22 of the braking drum 14 to define a cooling air channel 40 at the narrowest portion 36 of each of the spaces 34.

To best produce the desired air flow as shown in FIG. 1, the predetermined location 32 and the encircling steel band 38 are located closer to the opened end 16 than the flanged end 18 of the braking drum 14. Locating the steel band 38 in this region significantly adds to the overall strength of the preferred brake drum 10 since the greater forces acting thereon will be experienced at the opened end 16. Further, since the steel band 38 will add significant strength to the brake drum 10 when compared to the cast iron which is utilized for the braking drum 14, the overall configuration is significantly stronger without adding unduly to the overall weight of the brake drum 10.

Although the preferred brake drum 10 as described hereinabove would produce some venturi effect to cause the desired air flow in the space 34 between the fins 26, there is another preferred feature of the contour of the fins 26 which will further encourage the desired air flow without unduly complicating the casting of the brake drum 10. Specifically, as seen in FIG. 1, the brake drum 10 is designed to primarily rotate in the direction as indicated by the arrow D. With the brake drum 10 primarily rotating in a counterclockwise direction when viewed from the right, a portion 42 of the side walls 30 of each of the fins 26 between the opened end 16 and the predetermined location 32 and facing toward the direction D extends axially. A corresponding portion 44 of the side walls 28 of each adjacent fin 26 between the opened end 14 and the predetermined location 32 and facing away from the normal direction D is inclined from the opened end 16 to the predetermined location 32 in a direction which is circumferentially opposite from the normal direction D of rotation. Accordingly, the space 34 is provided a converging profile at the opened end 16 which tends to scoop the air into the narrowest portion 36 thereof in order to ensure the venturi action on the air will be initiated for proper flow through the space 34.

Figure 2:
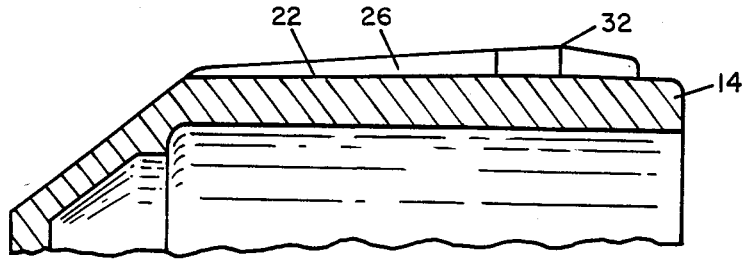
FIG. 2 is a fragmentary sectional view of the cylindrical braking drum of the invention as it is initially cast.

In order to provide the preferred brake drum 10, the cylindrical braking drum 14 is initially cast of iron as seen in FIG. 2. Since the profile of the fins 26 do not include any portion thereof which overlap in an axial direction, the preferred braking drum 14 is cast with the axially extending fins 26 thereof being formed by dies which would meet at the predetermined location 32. As a result, the preferred cylindrical braking drum 14 can be manufactured in green sand without requiring cores during the casting operation.

Figures 3, 4:
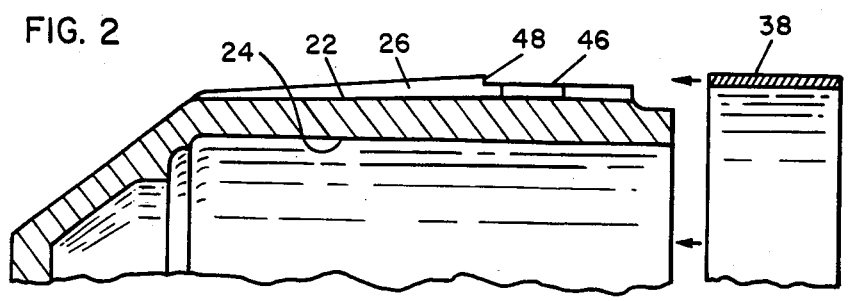
FIG. 3 is a sectional view of the braking drum as seen in FIG. 2 after machining.
FIG. 4 is a fragmentary sectional view of the steel bank prior to installation on the cylindrical braking drum.

As seen in FIG. 3, the cast braking drum 14 of FIG. 2 is machined to provide the desired braking surface 24 and to remove the top 46 of the fins 26 in a location thereof for receipt of the steel band 38. Specifically, a shoulder 48 is provided to establish the desired location of the end of the steel band 38.

As seen in FIG. 4, the steel band 38 is formed in a continuous ring and is sized to be received on the surface at the top 46 of each of the fins 26. It has been found that there are two effective means for mounting and securing the steel band 38 on the fins 26. First, it is possible for the steel band 38 to be simply pressed fit over the top 46 until contact is made at the shoulder 48. However, depending on the desired dimensions of the brake drum 10 and the type of fit desired for the steel band 38 thereof, a second means includes heating the steel band to a temperature of 1000° F. to 1100° F. and then positioning the steel band at the predetermined location 32 as described and allowing it to cool.

Although the preferred embodiment of the invention is described hereinabove, it should be clear that any number of alterations could be made thereto without departing from the scope of the invention as claimed.

I claim:

1. A brake drum comprising:
   (a) a cylindrical braking drum including a flanged end and an open end;
   (b) a plurality of generally axially extending fins spaced around the exterior surface of the braking drum, with the profiles of the fins being devoid of any portion thereof which overlap in an axial direction;
   (c) each of the fins including radially extending side walls which diverge along a length thereof from the open end to provide a widest distance therebetween at a predetermined location from the open end and converge along the length thereof from the predetermined location to the flanged end, wherein adjacent side walls of adjacent fins collectively defining a space therebetween having its narrowest portion at the predetermined location;
   (d) the brake drum being intended for rotation in a given direction and wherein the side walls of each fin diverging from the open end to the predetermined location including a first portion extending axially of the drum and facing towards the direction of rotation, and a second portion inclined from the open end to the predetermined location and facing away from the direction of rotation; and
   (e) a steel band secured to and encircling the braking drum at the predetermined location, the steel band cooperating with the adjacent side walls and the exterior surface of the braking drum to define a venturi-shaped cooling air channel at the narrowest portion of each of the spaces.

2. The brake drum as set forth in claim 1, wherein said predetermined location is closer to said opened end than said flange end.

3. The brake drum of claim 1 wherein the tops of the fins on either side of the predetermined locations are machined to form a shoulder extending around the drum and spaced inwardly of the opened end, and the steel band being disposed in engagement with the shoulder.

* * * * *